E. MUELLER.
TREAD SHOE FOR VEHICLE WHEELS.
APPLICATION FILED FEB. 26, 1917.
1,257,379. Patented Feb. 26, 1918.
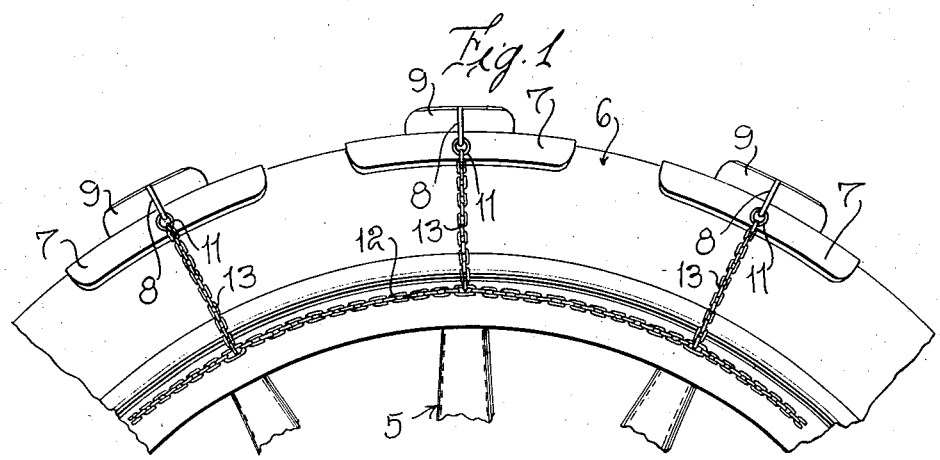
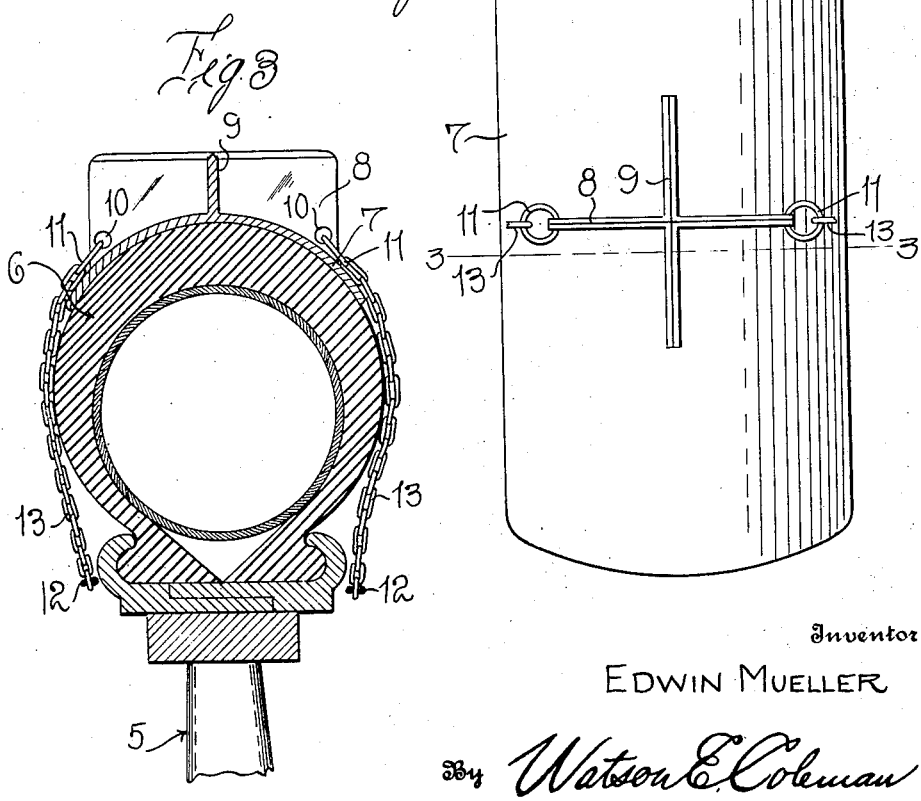
Inventor
EDWIN MUELLER
By Watson E. Coleman
Attorney

UNITED STATES PATENT OFFICE.

EDWIN MUELLER, OF ATHENS, WISCONSIN.

TREAD-SHOE FOR VEHICLE-WHEELS.

1,257,379.  Specification of Letters Patent.  Patented Feb. 26, 1918.

Application filed February 26, 1917. Serial No. 151,083.

*To all whom it may concern:*

Be it known that I, EDWIN MUELLER, a citizen of the United States, residing at Athens, in the county of Marathon and State of Wisconsin, have invented certain new and useful Improvements in Tread-Shoes for Vehicle-Wheels, of which the following is a specification, reference being had to the accompanying drawings.

This invention relates to an improved tread shoe for vehicle wheels and has for its primary object to provide a device of this character adapted to be applied to the periphery of the wheel tire, whereby the necessary tractive engagement of the wheel tread with the ground may be obtained in the movement of the machine over muddy or sandy roads, ice and snow, and in other instances where a device of this character is usually required.

It is another object of my invention to provide tread shoes for vehicle wheel tires, a series of the shoes being adapted to be arranged upon the periphery of the tire and connected and held in proper spaced relation by suitable side chains, each of the shoes consisting of a plate conforming to the longitudinal and transverse curvature of the tire and having a cruciform web formed upon its central portion.

It is a further object of the invention to provide a device for the above purpose which is simple in its construction, as well as strong and durable, and to which the side chains are connected in such manner as to tightly hold the longitudinal edges of the shoe plate in engagement upon the tire.

With the above and other objects in view, my invention consists in the novel features of construction, combination and arrangement of parts to be hereinafter more fully described, claimed and illustrated in the accompanying drawing, in which, Figure 1 is a side elevation of a portion of a wheel showing my improved tread shoe applied thereto;

Fig. 2 is an enlarged plan view of one of the shoes; and

Fig. 3 is a section taken on the line 3—3 of Fig. 2.

Referring in detail to the drawing, 5 designates a motor vehicle wheel and 6 the pneumatic tire thereof, upon which my improved tread shoe is adapted to be applied.

Each of the shoes consists of a base plate 7 which is longitudinally and transversely curved to conform to the curvature of the tread portion of the tire. Upon the central portion of this plate and on its outer convex face, a cruciform web is integrally formed. The plate or flange 8 extending from this web transversely of the base plate 7, is of a length slightly less than the width of the base plate and terminates inwardly from the longitudinal edges of the plate 7. The outer edge of the flange 8 extends in a straight line transversely of the tire, said plate gradually increasing in width from its center to the opposite ends thereof, as clearly shown in Fig. 3.

The other plate or flange 9 of the cruciform web is relatively narrow and extends longitudinally of the base plate 7 at its center. The outer edge of this flange 9 is curved in concentric relation to the longitudinal curvature of the plate 7, and at its center is disposed in a plane coincident with the plane of the outer edge of the plate 8.

Apertures indicated at 10 are formed in the ends of the transverse plate or flange 8 adjacent the surface of the base plate 7, and rings 11 are engaged through said apertures. 12 indicates the side chains which are disposed on each side of the wheel against the rim thereof, and short transverse chains 13 connect these side chains to the rings 11 of the several tread shoes. By tightening the chains 12, it will be readily understood that the series of tread chains (preferably nine), are clamped tightly upon the periphery of the wheel tire and retained in place thereon.

From the foregoing description, taken in connection with the accompanying drawing, the construction and several advantages of my improved tread shoe will be clearly and fully understood. It will, of course, be apparent that any desired number of the shoes may be connected together and applied to the wheel tire. The cruciform web formed on the central portion of each plate 7 provides means for securely gripping the road surface to prevent slipping or skidding of the wheel whereby the desired traction may be obtained to propel the machine. The webs or plates 8 and 9 are relatively thick at their juncture with the base plate 7 and taper slightly to their outer edges so that the mud or snow collecting thereon will readily release its hold upon the plates. The outer edge of the flange 9 being curved longitudinally of the tire provides a proper bearing surface and obviates sudden shock or jar to the body of the vehicle as the tread shoes successively engage the road surface.

My improved tread shoe is exceedingly simple and durable in its construction, can be easily and quickly applied to the wheel tire, and is very serviceable and reliable in practical use. The device may, of course, be constructed in various sizes, and while I have herein shown and described the preferred form and arrangement of its several features, it is to be understood that the same are susceptible of considerable modification and I, therefore, reserve the privilege of adopting all such legitimate changes as may be fairly embodied within the spirit and scope of the invention as claimed.

Having thus fully described my invention, what I desire to claim and secure by Letters Patent is:

A tread shoe comprising a base plate longitudinally and transversely curved and provided upon its convex face with a transversely extending web terminating at its ends in spaced relation to the longitudinal side edges of said plate, said web being provided in each end and contiguous to the convex face of the plate with an opening for the connection of retaining chains to said web.

In testimony whereof I hereunto affix my signature in the presence of two witnesses.

EDWIN MUELLER.

Witnesses:
 GEO. T. FULMER,
 F. T. MUELLER.